(12) United States Patent
Chen et al.

(10) Patent No.: US 8,165,216 B2
(45) Date of Patent: Apr. 24, 2012

(54) SYSTEM AND METHOD FOR IMPLEMENTING EFFICIENT DECODED BUFFER MANAGEMENT IN MULTI-VIEW VIDEO CODING

(75) Inventors: Ying Chen, Tampere (FI); Ye-Kui Wang, Tampere (FI); Miska Hannuksela, Ruutana (FI)

(73) Assignee: Nokia Corporation, Espoo (FI)

( * ) Notice: Subject to any disclaimer, the term of this patent is extended or adjusted under 35 U.S.C. 154(b) by 1176 days.

(21) Appl. No.: 11/872,665

(22) Filed: Oct. 15, 2007

(65) Prior Publication Data

US 2008/0117985 A1    May 22, 2008

Related U.S. Application Data

(60) Provisional application No. 60/852,223, filed on Oct. 16, 2006.

(51) Int. Cl.
*H04N 7/12* (2006.01)
*H04N 11/04* (2006.01)

(52) U.S. Cl. .............................. 375/240.24; 375/240.25

(58) Field of Classification Search .................. None
See application file for complete search history.

(56) References Cited

U.S. PATENT DOCUMENTS

| 6,341,330 | B1 | 1/2002 | Decarmo |
| 6,384,859 | B1 | 5/2002 | Matsumoto et al. |
| 7,233,621 | B2 | 6/2007 | Jeon |
| 7,489,342 | B2 | 2/2009 | Xin et al. |
| 7,577,198 | B2 | 8/2009 | Holcomb |
| 2008/0137742 | A1 | 6/2008 | Chen et al. |
| 2009/0220010 | A1* | 9/2009 | Park et al. ............... 375/240.25 |
| 2009/0279612 | A1* | 11/2009 | Pandit et al. ............ 375/240.25 |
| 2010/0002762 | A1* | 1/2010 | Pandit et al. ............ 375/240.01 |

FOREIGN PATENT DOCUMENTS

| KR | 10 0414629 | 5/2004 |
| WO | WO 2006062377 A1 | 6/2006 |
| WO | W02008048515 A2 | 4/2008 |

OTHER PUBLICATIONS

Li and He, A novel multi-view video coding scheme based on H.264. ICICS-PCM 2003, Dec. 15-18, 2003, Singapore.
International Search Report for PCT Patent Application No. PCT/IB2007/0542000.
Korean Office Action in Korean Application No. 10-2009-7009623.
English Translation of Korean Office Action in Korean Application No. 10-2009-7009623.
Supplementary European Search Report for European Patent Application No. EP 07826751, dated Mar. 30, 2011.

(Continued)

*Primary Examiner* — Marcus R Smith
(74) *Attorney, Agent, or Firm* — Alston & Bird LLP

(57) ABSTRACT

A system and method for encoding a first picture sequence and a second picture sequence into coded pictures, with the first picture sequence and the second picture sequence being different, and with at least one coded picture of the second picture sequence being predicted from at least one picture in the first picture sequence. According to various embodiments of the present invention, signal element is encoded into a coded picture of the second picture sequence. The signal element indicates whether a picture in the first picture sequence is used for prediction of the coded picture of the second picture sequence.

11 Claims, 6 Drawing Sheets

OTHER PUBLICATIONS

"Requirements on Multi-view Video Coding v. 7", ITU Study Group 16—Video Coding Experts Group, ISO/IEC JMPEG & ITU-T VCEG, N8218, Austria, pp. 1-5, Jul. 2006.

Purvin Pandit et al., "MVC high-levl syntax for random access", ITU Study Group 16—Video Coding Experts Group, ISO/IEC JTC1/SC29/WG11, M13715, Austria, pp. 1-11, Jul. 2006.

Vetro Anthony, "Joint Multiview Video Model (JMVM) 1.0," ITU Study Group 16—Video Coding Experts Group, ISO/IEC MPEG & ITU-T VCEG, JVT-T208, Austria, Jul. 2006.

Wang, Y-K et al., "Comments to JMVM 1.0", ITU Study Group 16—Video Coding Experts Group, ISO/IEC MPEG & ITU-T VCEG, JVT-U103-L, China, Oct. 2006.

Wenger, S., et al.; "RTP Payload Format for H.264 Video"; Network Working Group; © The Internet Society; Feb. 2005.

Joint Video Team (JVT) of ISO/IEC MPEG & ITU-T VCEG (ISO/IEC JTC1/SC29/WG11 and ITU-T SG61 Q.6); "Joint Multiview Video Model (JMVM) 1.0"; $20^{th}$ Meeting; Klagenfurt, Austria; Jul. 2006.

* cited by examiner

FIG. 7

| nal_unit_header_svc_mvc_extension( ) { | C | Descriptor |
|---|---|---|
| svc_mvc_flag | All | u(1) |
| if(!svc_mvc_flag) { | | |
| priority_id | All | u(6) |
| discardable_flag | All | u(1) |
| temporal_level | All | u(3) |
| dependency_id | All | u(5) |
| quality_level | All | u(2) |
| layer_base_flag | All | u(1) |
| use_base_prediction_flag | All | u(1) |
| fragmented_flag | All | u(1) |
| last_fragment_flag | All | u(1) |
| fragment_order | All | u(2) |
| reserved_zero_two_bits | All | u(2) |
| } else { | | |
| view_refresh_flag | All | u(1) |
| view_subset_id | All | u(2) |
| view_level | All | u(3) |
| anchor_pic_flag | All | u(1) |
| view_id | All | u(10) |
| reserved_zero_five_bits | All | u(6) |
| } | | |
| nalUnitHeaderBytes += 3 | | |
| } | | |

SYSTEM AND METHOD FOR IMPLEMENTING EFFICIENT DECODED BUFFER MANAGEMENT IN MULTI-VIEW VIDEO CODING

FIELD OF THE INVENTION

The present invention relates to generally video coding. More specifically, the present invention relates to coded picture buffer management in multi-view video coding.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

In multi-view video coding, video sequences output from different cameras, each corresponding to different views of a scene, are encoded into one bitstream. After decoding, to display a certain view, the decoded pictures belonging to that view are reconstructed and displayed. It is also possible for more than one view to be reconstructed and displayed.

Multiview video coding possesses a wide variety of applications, including free-viewpoint video/television, three dimensional (3D) TV and surveillance applications. Currently, the Joint Video Team (JVT) of the International Organization for Standardization (ISO)/International Engineering Consotium (IEC) Motion Picture Expert Group (MPEG) and International Telecommunication Union (ITU)-T Video Coding Expert Group is working to develop a multiview video coding (MVC) standard, which is becoming an extension of the ITU-T H.264 standard, also known as ISO/IEC MPEG-4 Part-10. These draft standards as referred to herein as MVC and AVC, respectively. The latest draft of the MVC standard is described in JVT-T208, "Joint Multiview Video Model (JMVM) 1.0", 20$^{th}$ JVT meeting, Klagenfurt, Austria, July 2006, can be found at ftp3.itu.ch/av-arch/jvt-site/2006_07_Klagenfurt/JVT-T208.zip, and is incorporated herein by reference in its entirety.

In JMVM 1.0, for each group of pictures (GOP), pictures of any view are contiguous in decoding order. This is depicted in FIG. 1, where the horizontal direction denotes time (with each time instant being represented by Tm) and the vertical direction denotes view (with each view being represented by Sn). Pictures of each view are grouped into GOPs, e.g. pictures T1 to T8 in FIG. 1 for each view form a GOP. This decoding order arrangement is referred to as view-first coding. It should be noted that, for the pictures in one view and in one GOP, although their decoding order is continuous without any other pictures to be inserted between any two of the pictures, internally their decoding order may change.

It is also possible to have a different decoding order than that discussed for first-view coding. For example, pictures can be arranged such that pictures of any temporal location are contiguous in decoding order. This arrangement is shown in FIG. 2. This decoding order arrangement is referred to as time-first coding. It should also be noted that the decoding order of access units may not be identical to the temporal order.

A typical prediction structure (including both inter-picture prediction within each view and inter-view prediction) for multi-view video coding is shown in FIG. 2, where predictions are indicated by arrows, and the pointed-to object using the pointed-from object for prediction reference. Inter-picture prediction within one view is also referred to as temporal prediction, intra-view prediction, or, simply, inter prediction.

An Instantaneous Decoding Refresh (IDR) picture is an intra-coded picture that causes the decoding process to mark all reference pictures as "unused for reference" immediately after decoding the IDR picture. After the decoding of an IDR picture, all following coded pictures in decoding order can be decoded without inter prediction from any picture decoded prior to the IDR picture.

In AVC and MVC, coding parameters that remain unchanged through a coded video sequence are included in a sequence parameter set. In addition to parameters that are essential to the decoding process, the sequence parameter set may optionally contain video usability information (VUI), which includes parameters that are important for buffering, picture output timing, rendering, and resource reservation. There are two structures specified to carry sequence parameter sets—the sequence parameter set NAL unit containing all the data for AVC pictures in the sequence, and the sequence parameter set extension for MVC. A picture parameter set contains such parameters that are likely to be unchanged in several coded pictures. Frequently changing picture-level data is repeated in each slice header, and picture parameter sets carry the remaining picture-level parameters. H.264/AVC syntax allows many instances of sequence and picture parameter sets, and each instance is identified with a unique identifier. Each slice header includes the identifier of the picture parameter set that is active for the decoding of the picture that contains the slice, and each picture parameter set contains the identifier of the active sequence parameter set. Consequently, the transmission of picture and sequence parameter sets does not have to be accurately synchronized with the transmission of slices. Instead, it is sufficient that the active sequence and picture parameter sets be received at any moment before they are referenced, which allows for transmission of parameter sets using a more reliable transmission mechanism compared to the protocols used for the slice data. For example, parameter sets can be included as a MIME parameter in the session description for H.264/AVC Real-Time Protocol (RTP) sessions. It is recommended to use an out-of-band reliable transmission mechanism whenever it is possible in the application in use. If parameter sets are transmitted in-band, they can be repeated to improve error robustness.

As discussed herein, an anchor picture is a coded picture in which all slices reference only slices with the same temporal index, i.e., only slices in other views and not slices in earlier pictures of the current view. An anchor picture is signaled by setting an anchor_pic_flag to 1. After decoding the anchor picture, all subsequent coded pictures in display order are capable of being decoded without inter-prediction from any picture decoded prior to the anchor picture. If a picture in one view is an anchor picture, then all pictures with the same temporal index in other views are also anchor pictures. Consequently, the decoding of any view can be initiated from a temporal index that corresponds to anchor pictures.

Picture output timing, such as output timestamping, is not included in the integral part of AVC or MVC bitstreams. However, a value of picture order count (POC) is derived for each picture and is non-decreasing with increasing picture position in output order relative to the previous IDR picture or a picture containing a memory management control operation marking all pictures as "unused for reference." POC therefore indicates the output order of pictures. It is also used in the decoding process for implicit scaling of motion vectors in the direct modes of bi-predictive slices, for implicitly derived weights in weighted prediction, and for reference picture list initialization of B slices. Furthermore, POC is also used in the verification of output order conformance.

Values of POC can be coded with one of the three modes signaled in the active sequence parameter set. In the first mode, the selected number of least significant bits of the POC value is included in each slice header. In the second mode, the relative increments of POC as a function of the picture position in decoding order in the coded video sequence are coded in the sequence parameter set. In addition, deviations from the POC value derived from the sequence parameter set may be indicated in slice headers. In the third mode, the value of POC is derived from the decoding order by assuming that the decoding and output order are identical. In addition, only one non-reference picture can occur consecutively when the third mode is used.

nal_ref_idc is a 2-bit syntax element in the NAL unit header. The value of nal_ref_idc indicates the relevance of the NAL unit for reconstruction of sample values. Non-zero values of nal_ref_idc must be used for coded slice and slice data partition NAL units of reference pictures, as well as for parameter set NAL units. The value of nal_ref_idc must be equal to 0 for slices and slice data partitions of non-reference pictures and for NAL units that do not affect the reconstruction of sample values, such as supplemental enhancement information NAL units. In the H.264/AVC high-level design, external specifications (i.e. any system or specification using or referring to H.264/AVC) were permitted to specify an interpretation to the non-zero values of nal_ref_idc. For example, the RTP payload format for H.264/AVC, Request for Comments (RFC) 3984 (which can be found at www.ietf.org/rfc/rfc3984.txt and is incorporated herein by reference) specified strong recommendations on the use of nal_ref_idc. In other words, some systems have established practices to set and interpret the non-zero nal_ref_idc values. For example, an RTP mixer might set nal_ref_idc according to the NAL unit type, e.g. nal_ref_idc is set to 3 for IDR NAL units. As MVC is a backward-compatible extension of the H.264/AVC standard, it is desirable that existing H.264/AVC-aware system elements also be capable of handling MVC streams. It is therefore undesirable for the semantics of particular non-zero value of nal_ref_idc to be specified differently in the MVC specification compared to any other non-zero value of nal_ref_idc.

Decoded pictures used for predicting subsequent coded pictures and for future output are buffered in a decoded picture buffer (DPB). To efficiently utilize the buffer memory, the DPB management processes, including the storage process of decoded pictures into the DPB, the marking process of reference pictures, output and removal processes of decoded pictures from the DPB, should be specified.

The process for reference picture marking in AVC is generally as follows. The maximum number of reference pictures used for inter prediction, referred to as M, is indicated in the active sequence parameter set. When a reference picture is decoded, it is marked as "used for reference." If the decoding of the reference picture causes more than M pictures to be marked as "used for reference," then at least one picture must be marked as "unused for reference." The DPB removal process would then remove pictures marked as "unused for reference" from the DPB if they are not needed for output as well.

There are two types of operations for the reference picture marking: adaptive memory control and sliding window. The operation mode for reference picture marking is selected on a picture basis. The adaptive memory control requires the presence of memory management control operation (MMCO) commands in the bitstream. The memory management control operations enable the explicit signaling of which pictures are marked as "unused for reference," the assigning long-term indices to short-term reference pictures, the storage of the current picture as long-term picture, the changing of a short-term picture to the long-term picture, and the assigning of the maximum allowed long-term index (MaxLongTermFrameIdx) for long-term pictures. If the sliding window operation mode is in use and there are M pictures marked as "used for reference," then the short-term reference picture that was the first decoded picture among those short-term reference pictures that are marked as "used for reference" is marked as "unused for reference." In other words, the sliding window operation mode results in a first-in/first-out buffering operation among short-term reference pictures.

Each short-term picture is associated with a variable PicNum that is derived from the frame_num syntax element. Each long-term picture is associated with a variable LongTermPicNum that is derived form the long_term_frame_idx syntax element, which is signaled by MMCO command. PicNum is derived from the FrameNumWrap syntax element, depending on whether frame or field is coded or decoded. For frames where PicNum equals to FrameNumWrap, FrameNumWrap is derived from FrameNum, and FrameNum is derived directly from frame_num. For example, in AVC frame coding, FrameNum is assigned the same value as frame_num, and FrameNumWrap is defined as follows:

```
if( FrameNum > frame_num )
    FrameNumWrap = FrameNum - MaxFrameNum
else
    FrameNumWrap = FrameNum
```

LongTermPicNum is derived from the long-term frame index (LongTermFrameIdx) assigned for the picture. For frames, LongTermPicNum equals to LongTermFrameIdx. frame_num is a syntax element in each slice header. The value of frame_num for a frame or a complementary field pair essentially increments by one, in modulo arithmetic, relative to the frame_num of the previous reference frame or reference complementary field pair. In IDR pictures, the value of frame_num is zero. For pictures containing a memory management control operation marking all pictures as "unused for reference," the value of frame_num is considered to be zero after the decoding of the picture.

The MMCO commands use PicNum and LongTermPicNum for indicating the target picture for the command as follows. To mark a short-term picture as "unused for reference," the PicNum difference between the current picture p and the destination picture r is signaled in the MMCO command. To mark a long-term picture as "unused for reference," the LongTermPicNum of the to-be-removed picture r is signaled in the MMCO command. To store the current picture p as a long-term picture, a long_term_frame_idx is signaled with the MMCO command. This index is assigned to the newly stored long-term picture as the value of LongTermPicNum. To change a picture r from being a short-term picture to a long-term picture, a PicNum difference between current picture p and picture r is signaled in the MMCO command, the long_term_frame_idx is signaled in the MMCO command, and the index is assigned to the this long-term picture.

When multiple reference pictures could be used, each reference picture must be identified. In AVC, the identification of a reference picture used for a coded block is as follows. First, all the reference pictures stored in the DPB for prediction reference of future pictures is either marked as "used for short-term reference" (short-term pictures) or "used for long-term reference" (long-term pictures). When decoding a coded slice, a reference picture list is constructed. If the coded slice is a bi-predicted slice, then a second reference picture list is also constructed. A reference picture used for a coded block is then identified by the index of the used reference picture in the reference picture list. The index is coded in the bitstream when more than one reference picture may be used.

The reference picture list construction process is as follows. For simplicity, it is assumed that only one reference picture list is needed. First, an initial reference picture list is constructed including all of the short-term and long-term pictures. Reference picture list reordering (RPLR) is then performed when the slice header contains RPLR commands. The PRLR process may reorder the reference pictures into a different order than the order in the initial list. Lastly, the final list is constructed by keeping only a number of pictures in the beginning of the possibly reordered list, with the number being indicated by another syntax element in the slice header or the picture parameter set referred by the slice.

During the initialization process, all of the short-term and long-term pictures are considered as candidates for reference picture lists for the current picture. Regardless of whether the current picture is a B or P picture, long-term pictures are placed after the short-term pictures in RefPicList0 (and RefPicList1 available for B slices). For P pictures, the initial reference picture list for RefPicList0 contains all short-term reference pictures ordered in descending order of PicNum. For B pictures, those reference pictures obtained from all short term pictures are ordered by a rule related to the current POC number and the POC number of the reference picture—for RefPicList0, reference pictures with smaller POC (comparing to current POC) are considered first and inserted into the RefPictList0 with the descending order of POC. Then pictures with larger POC are appended with the ascending order of POC. For RefPicList1 (if available), reference pictures with larger POC (compared to the current POC) are considered first and inserted into the RefPicList1 with ascending order of POC. Pictures with smaller POC are then appended with descending order of POC. After considering all the short-term reference pictures, the long-term reference pictures are appended by ascending order of LongTermPicNum, both for P and B pictures.

The reordering process is invoked by continuous RPLR commands, which includes four types. The first type is a command to specify a short-term picture with smaller PicNum (comparing to a temporally predicted PicNum) to be moved. The second type is a command to specify a short-term picture with larger PicNum to be moved. The third type is a command to specify a long-term picture with a certain LongTermPicNum to be moved and the end of the RPLR loop. If the current picture is bi-predicted, then there are two loops—one for a forward reference list and the other for a backward reference list.

The predicted PicNum called picNumLXPred is initialized as the PicNum of the current coded picture. This is set to the PicNum of the just-moved picture after each reordering process for a short-term picture. The difference between the PicNum of the current picture being reordered and picNumLXPred is to be signaled in the RPLR command. The picture indicated to be reordered is moved to the beginning of the reference picture list. After the reordering process is completed, a whole reference picture list is to be truncated based on the active reference picture list size, which is num_ref_idx__1X_active_minus1+1 (X equal to 0 or 1 corresponds for RefPicList0 and RefPicList1 respectively).

The hypothetical reference decoder (HRD), specified in Annex C of the H.264/AVC standard, is used to check bitstream and decoder conformance The HRD contains a coded picture buffer (CPB), an instantaneous decoding process, a decoded picture buffer (DPB), and an output picture cropping block. The CPB and the instantaneous decoding process are specified similarly to any other video coding standard, and the output picture cropping block simply crops those samples from the decoded picture that are outside of the signaled output picture extents. The DPB was introduced in H.264/AVC in order to control the required memory resources for decoding of conformant bitstreams.

There are two reasons to buffer decoded pictures, for references in inter prediction and for reordering decoded pictures into output order. As the H.264/AVC standard provides a great deal of flexibility for both reference picture marking and output reordering, separate buffers for reference picture buffering and output picture buffering could be a waste of memory resources. Therefore, the DPB includes a unified decoded picture buffering process for reference pictures and output reordering. A decoded picture is removed from the DPB when it is no longer used as reference and needed for output. The maximum size of the DPB that bitstreams are allowed to use is specified in the Level definitions (Annex A) of the H.264/AVC standard.

There are two types of conformance for decoders: output timing conformance and output order conformance. For output timing conformance, a decoder must output pictures at identical times compared to the HRD. For output order conformance, only the correct order of output picture is taken into account. The output order DPB is assumed to contain a maximum allowed number of frame buffers. A frame is removed from the DPB when it is no longer used as reference and needed for output. When the DPB becomes full, the earliest frame in output order is output until at least one frame buffer becomes unoccupied.

Temporal scalability is realized by the hierarchical B picture GOP structure using only AVC tools. A typical temporal scalability GOP usually includes a key picture which is coded as an I or P frame, and other pictures which are coded as B pictures. Those B pictures are coded hierarchically based on the POC. The coding of a GOP needs only the key pictures of the previous GOP besides those pictures in the GOP. The relative POC number (POC minus the previous anchor picture POC) is referred to as POCIdInGOP in implementation. Every POCIdInGOP can have a form of POCIdInGOP=$2^x$y (wherein y is an odd number). Pictures with the same value of x belong to the same temporal level, which is noted as L-x (where L=log 2(GOP_length)). Only pictures with the highest temporal level L are not stored as reference pictures. Normally, pictures in a temporal level can only use pictures in lower temporal levels as references to support temporal scalability, i.e. higher temporal level pictures can be dropped without affecting the decoding of the lower temporal level pictures. Similarly, the same hierarchical structure can be applied in the view dimension for view scalability.

In the current JMVM, frame_num is separately coded and signaled for each view, i.e. the value of frame_num is incremented relative to the previous reference frame or reference complementary field pair within the same view as the current picture. Furthermore, pictures in all views share the same DPB buffer. In order to globally handle the reference picture list construction and the reference picture management, FrameNum and POC generation are redefined as follows:

```
FrameNum=frame_num * (1 + num_views_minus_1) + view_id
PicOrderCnt( ) = PicOrderCnt( ) * (1 + num_views_minus_1) +
view_id;
```

JMVM basically follows the same reference picture marking as that used for AVC. The only difference is that, in JMVM the FrameNum is redefined and so that the FrameNumWrap is redefined as follows:

```
if( FrameNum > frame_num * (1 + num_views_minus_1) + view_id )
    FrameNumWrap = FrameNum − MaxFrameNum *
(1 + num_views_minus_1) + view_id
else
    FrameNumWrap = FrameNum
```

In the current JMVM standard, inter-view reference pictures are implicitly specified in the SPS (Sequence Parameter Set) extension, wherein the active number of inter-view reference lists and the view id of those pictures are specified. This information is shared by all pictures referring to the same SPS. The reference picture list construction process first performs reference picture list initialization, reordering and truncation in the same way as in AVC, but taking into account all of the reference pictures stored in the DPB. The pictures with view ids specified in the SPS and within same temporal axis (i.e. having the same capture/output time) are then appended to the reference list in the order as they are listed in the SPS.

Unfortunately, the above JSVM designs lead to a number of problems. First, it is sometimes desirable that switching of decoded (by a decoder), transmitted (by a sender) or forwarded (by a media gateway or MANE) views could occur in a time index other than such that corresponds to anchor pictures. For example, a base view can be compressed for highest coding efficiency (temporal prediction is heavily used) and anchor pictures are coded infrequently. Consequently, anchor pictures for other views also occur infrequently, as they are synchronized across all views. The current JMVM syntax does not include signaling of a picture from which decoding of a certain view can be started (unless all views of that time index contain an anchor picture).

Second, the allowed reference views for inter-view prediction are specified for each view (and separately for anchor and non-anchor pictures). However, depending on the similarity between a picture being coded and a potential picture in the same temporal axis and in a potential reference view, inter-view prediction may or may not be performed in the encoder. The current JMVM standard uses nal_ref_idc to indicate whether a picture is used for intra-view or inter-view prediction, but it cannot separately indicate if a picture is used for intra-view prediction and/or inter-view prediction. In addition, according to JMVM 1.0, for the AVC compatible view, nal_ref_idc must be set to not equal to 0 even if the picture is not used for temporal prediction when it is used only for inter view prediction reference. Consequently, if only that view is decoded and output, additional DPB size is needed for storage of such pictures when such pictures can be outputted as soon as they are decoded.

Third, it is noted that the reference picture marking process specified in JMVM 1.0 is basically identical to the AVC process, except for the redefinition of FrameNum, FrameNumWrap and consequently PicNum. Therefore, a number of special problems arise. For example, this process cannot efficiently handle the management of decoded pictures that are required to be buffered for inter-view prediction, particularly when those pictures are not used for temporal prediction reference. The reason is that the DPB management process specified in the AVC standard was intended for single-view coding. In single-view coding such as in the AVC standard, decoded pictures that need to be buffered for temporal prediction reference or future output can be removed from the buffer when they are no longer needed for temporal prediction reference and future output. To enable the removal of a reference picture as soon as it becomes no longer needed for temporal prediction reference and future output, the reference picture marking process is specified such that it can be known immediately after a reference picture becomes no longer needed for temporal prediction reference. However, when it comes to pictures for inter-view prediction reference, there lacks a way to immediately know after a picture becomes no longer needed for inter-view prediction reference. Consequently, pictures for inter-view prediction reference may be unnecessarily buffered in the DPB, which reduces the efficiency of the buffer memory usage.

In another example, given the way to recalculate the PicNum, if the sliding window operation mode is in use and the number of short-term and long-term pictures is equal to the maximum, the short-term reference picture that has the smallest FrameNumWrap is marked as "unused for reference." However, due to the fact that this picture is not necessarily the earliest coded picture because the FrameNum order in the current JMVM does not follow the decoding order, the sliding window reference picture marking does not operate optimally in the current JMVM. Still further, due to the fact that PicNum is derived from the redefined and scaled FrameNumWrap, the difference between the PicNum values of two coded pictures would be scaled in average. For example, it is helpful to assume that there are two pictures in the same view and having frame_num equal to 3 and 5, respectively. When there is only one view, i.e. the bitstream is an AVC stream, then the difference of the two PicNum values would be 2. When coding the picture having frame_num equal to 5, if an MMCO command is needed to mark the picture having PicNum equal to 3 as "unused for reference", then the difference of the two values minus 1 is equal to 1, which is to be signalled in the MMCO. This value needs 3 bits. However, if there are 256 views, then the difference of the two PicNum values minus 1 would become 511. In this case, 19 bits are required for signalling of the value. Consequently, MMCO commands are much less efficiently coded. Typically, the increased number of bits is equal to 2*log 2(number of views) for an MMCO command of the current JMVM compared to single-view coding of H.264/AVC.

A fourth set of problems surrounds the reference picture list construction process specified in JMVM 1.0. The reference picture list initialization process considers reference pictures from all views before the reordering process. However, due to the fact that the pictures from other views used for inter-view prediction are appended to the list after truncating the list, reference pictures from other views do not appear in the reference picture list after reordering and truncation anyway. Therefore, consideration of those pictures in the initialization process is a not needed. Furthermore, illegal reference pictures (such pictures that have a different view_id than the current picture and are not temporally aligned with the current picture) and repeated inter-view reference pictures may appear in the finally constructed reference picture list.

The reference picture list initialization process operates as listed in the following steps: (1) All of the reference pictures are included in the initial list regardless of their view_id and whether they are temporally aligned with the current picture. In other words, the initial reference picture list may contain illegal reference pictures (such pictures that have a different view_id than the current picture and are not temporally aligned with the current picture). However, in view-first coding, the beginning of the initial list contains reference pictures from the same view as the current picture. (2) Both intra-view reference pictures and inter-view pictures may be reordered. After reordering, the beginning of the list may still contain illegal reference pictures. (3) The list is truncated, but the truncated list may still contain illegal reference pictures. (4) The inter-view reference pictures are appended to the list in the order they appear in the MVC extension of SPS.

Additionally, the reference picture list reordering process specified in JMVM 1.0 does not allow for the reordering of inter-view frames, which are always put in the end of the list in the order as they appear in the MVC extension of SPS. This causes less flexibility for reference picture list construction, which results in reduced compression efficiency, when the default order of inter-view reference frames is not optimal or certain inter-view reference frames are more likely to be used for prediction than certain intra-view reference frames. Still further, similar to MMCO commands, due to the fact that PicNum is derived from the redefined and scaled FrameNum-Wrap, longer VLC codewords are required for coding of RPLR commands involving the signaling of a difference between PicNum values minus 1 compared to the single-view coding of the H.264/AVC standard.

SUMMARY OF THE INVENTION

The present invention provides an improved system and method for implementing efficient decoded picture buffer management in multi-view video coding. In one embodiment, a new flag is used to indicate whether the decoding of a view can be started from a certain picture. In a more particular embodiment, this flag is signaled in the NAL unit header. In another embodiment, a new flag is used to indicate whether a picture is used for inter-view prediction reference, while the syntax element nal_ref_idc only indicates whether a picture is used for temporal prediction reference. This flag can also be signaled in the NAL unit header. In a third embodiment, a set of new reference picture marking methods are used to efficiently manage the decoded pictures. These methods can include both sliding window and adaptive memory control mechanisms. In a fourth embodiment, a set of new reference picture list construction methods are used and include both reference picture list initialization and reordering.

These and other advantages and features of the invention, together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

FIG. 7 is a representation of exemplary syntax and semantics of a flag signaled to indicate whether a view is used for inter-view prediction reference in accordance with various embodiments.

DETAILED DESCRIPTION OF THE VARIOUS EMBODIMENTS

Figure 1:
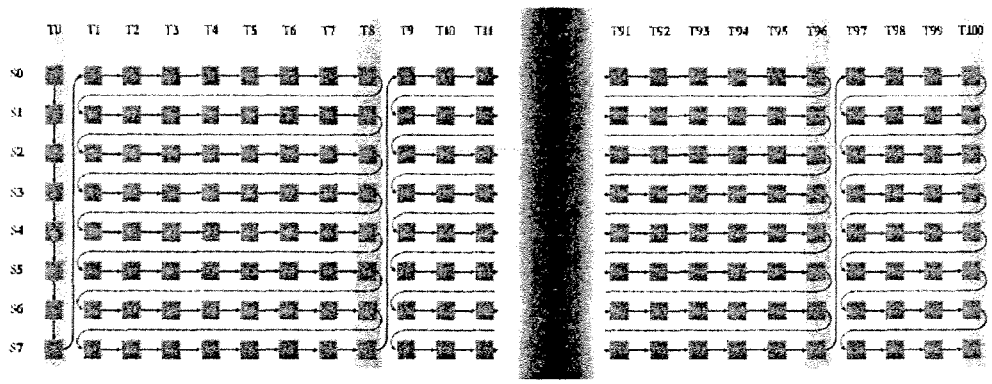
FIG. 1 is an arrangement of pictures in a first-view coding arrangement.
Figure 2:
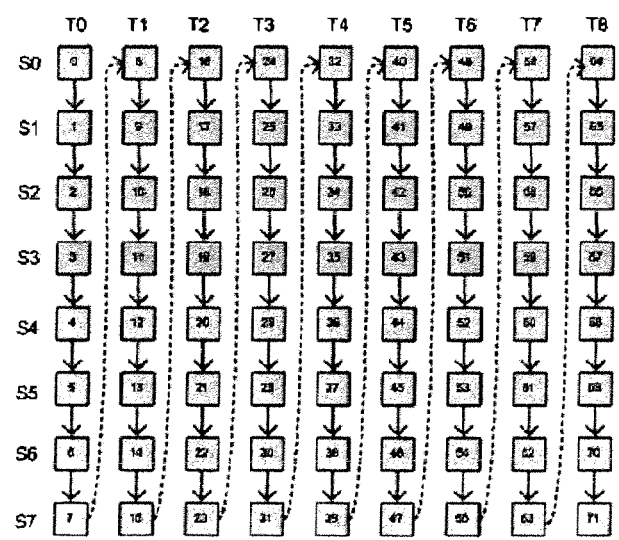
FIG. 2 is an arrangement of pictures in a time-first coding arrangement.
Figure 3:
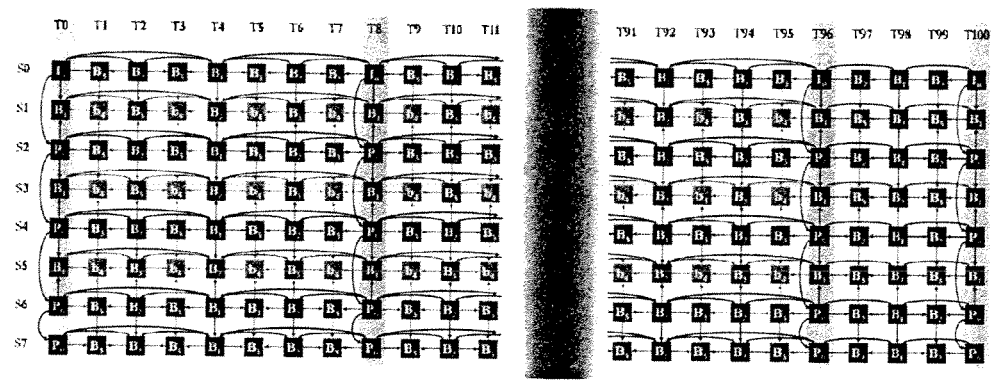
FIG. 3 is a depiction of an example MVC temporal and inter-view prediction structure.
Figure 4:
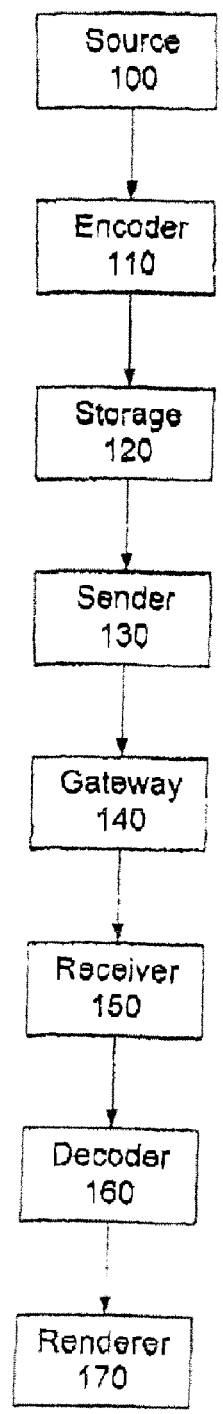
FIG. 4 is an overview diagram of a system within which the present invention may be implemented.

FIG. 4 shows a generic multimedia communications system for use with the present invention. As shown in FIG. 4, a data source 100 provides a source signal in an analog, uncompressed digital, or compressed digital format, or any combination of these formats. An encoder 110 encodes the source signal into a coded media bitstream. The encoder 110 may be capable of encoding more than one media type, such as audio and video, or more than one encoder 110 may be required to code different media types of the source signal. The encoder 110 may also get synthetically produced input, such as graphics and text, or it may be capable of producing coded bitstreams of synthetic media. In the following, only processing of one coded media bitstream of one media type is considered to simplify the description. It should be noted, however, that typically real-time broadcast services comprise several streams (typically at least one audio, video and text sub-titling stream). It should also be noted that the system may include many encoders, but in the following only one encoder 110 is considered to simplify the description without a lack of generality.

The coded media bitstream is transferred to a storage 120. The storage 120 may comprise any type of mass memory to store the coded media bitstream. The format of the coded media bitstream in the storage 120 may be an elementary self-contained bitstream format, or one or more coded media bitstreams may be encapsulated into a container file. Some systems operate "live", i.e. omit storage and transfer coded media bitstream from the encoder 110 directly to the sender 130. The coded media bitstream is then transferred to the sender 130, also referred to as the server, on a need basis. The format used in the transmission may be an elementary self-contained bitstream format, a packet stream format, or one or more coded media bitstreams may be encapsulated into a container file. The encoder 110, the storage 120, and the sender 130 may reside in the same physical device or they may be included in separate devices. The encoder 110 and sender 130 may operate with live real-time content, in which case the coded media bitstream is typically not stored permanently, but rather buffered for small periods of time in the content encoder 110 and/or in the sender 130 to smooth out variations in processing delay, transfer delay, and coded media bitrate.

The sender 130 sends the coded media bitstream using a communication protocol stack. The stack may include but is not limited to Real-Time Transport Protocol (RTP), User Datagram Protocol (UDP), and Internet Protocol (IP). When the communication protocol stack is packet-oriented, the sender 130 encapsulates the coded media bitstream into packets. For example, when RTP is used, the sender 130 encapsulates the coded media bitstream into RTP packets according to an RTP payload format. Typically, each media type has a dedicated RTP payload format. It should be again noted that a system may contain more than one sender 130, but for the sake of simplicity, the following description only considers one sender 130.

The sender 130 may or may not be connected to a gateway 140 through a communication network. The gateway 140 may perform different types of functions, such as translation of a packet stream according to one communication protocol stack to another communication protocol stack, merging and forking of data streams, and manipulation of data stream according to the downlink and/or receiver capabilities, such as controlling the bit rate of the forwarded stream according to prevailing downlink network conditions. Examples of gateways 140 include multipoint conference control units (MCUs), gateways between circuit-switched and packet-switched video telephony, Push-to-talk over Cellular (PoC) servers, IP encapsulators in digital video broadcasting-handheld (DVB-H) systems, or set-top boxes that forward broadcast transmissions locally to home wireless networks. When RTP is used, the gateway 140 is called an RTP mixer and acts as an endpoint of an RTP connection.

The system includes one or more receivers 150, typically capable of receiving, de-modulating, and de-capsulating the transmitted signal into a coded media bitstream. The coded media bitstream is typically processed further by a decoder 160, whose output is one or more uncompressed media streams. It should be noted that the bitstream to be decoded can be received from a remote device located within virtually any type of network. Additionally, the bitstream can be received from local hardware or software. Finally, a renderer 170 may reproduce the uncompressed media streams with a loudspeaker or a display, for example. The receiver 150, decoder 160, and renderer 170 may reside in the same physical device or they may be included in separate devices.

Scalability in terms of bitrate, decoding complexity, and picture size is a desirable property for heterogeneous and error prone environments. This property is desirable in order to counter limitations such as constraints on bit rate, display resolution, network throughput, and computational power in a receiving device.

It should be understood that, although text and examples contained herein may specifically describe an encoding process, one skilled in the art would readily understand that the same concepts and principles also apply to corresponding decoding process and vice versa. It should be noted that the bitstream to be decoded can be received from a remote device located within virtually any type of network. Additionally, the bitstream can be received from local hardware or software.

Communication devices of the present invention may communicate using various transmission technologies including, but not limited to, Code Division Multiple Access (CDMA), Global System for Mobile Communications (GSM), Universal Mobile Telecommunications System (UMTS), Time Division Multiple Access (TDMA), Frequency Division Multiple Access (FDMA), Transmission Control Protocol/Internet Protocol (TCP/IP), Short Messaging Service (SMS), Multimedia Messaging Service (MMS), e-mail, Instant Messaging Service (IMS), Bluetooth, IEEE 802.11, etc. A communication device may communicate using various media including, but not limited to, radio, infrared, laser, cable connection, and the like.

Figure 5:
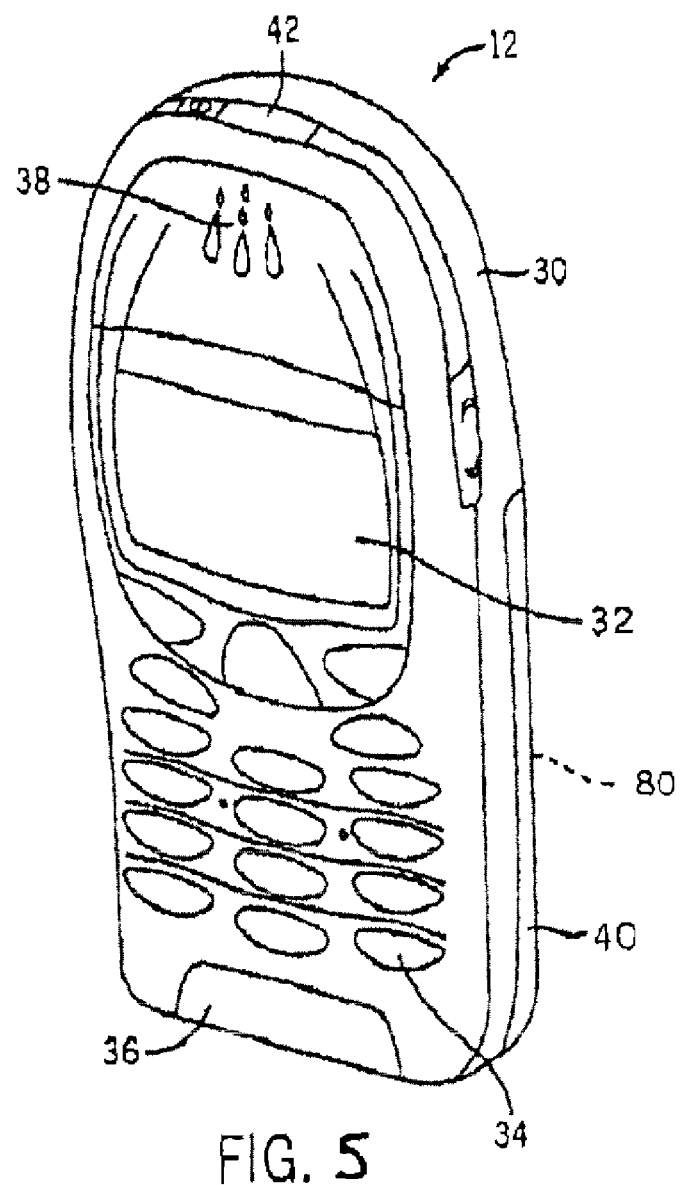
FIG. 5 is a perspective view of a mobile device that can be used in the implementation of the present invention.
Figure 6:
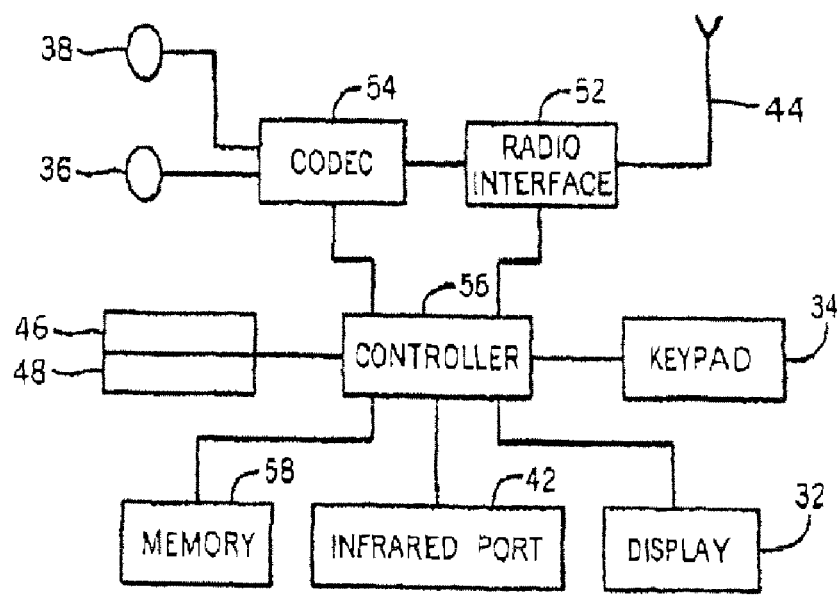
FIG. 6 is a schematic representation of the circuitry of the mobile device of FIG. 5.

FIGS. 5 and 6 show one representative mobile device 12 within which the present invention may be implemented. It should be understood, however, that the present invention is not intended to be limited to one particular type of mobile device 12 or other electronic device. Some or all of the features depicted in FIGS. 5 and 6 could be incorporated into any or all devices that may be utilized in the system shown in FIG. 4.

The mobile device 12 of FIGS. 5 and 6 includes a housing 30, a display 32 in the form of a liquid crystal display, a keypad 34, a microphone 36, an ear-piece 38, a battery 40, an infrared port 42, an antenna 44, a smart card 46 in the form of a UICC according to one embodiment of the invention, a card reader 48, radio interface circuitry 52, codec circuitry 54, a controller 56 and a memory 58. Individual circuits and elements are all of a type well known in the art, for example in the Nokia range of mobile devices.

The present invention provides an improved system and method for implementing efficient decoded picture buffer management in multi-view video coding. To address the issue surrounding the fact that the current JMVM syntax does not include the signaling of a picture from which decoding of a certain view can be started (unless all views of that time index contain an anchor picture), a new flag is signaled indicating whether a view can be accessed from a certain picture, i.e., whether the decoding of a view can be started from a certain picture. In one embodiment of the invention, this flag is signaled in the NAL unit header. The following is an example of the syntax and semantics of the flag according to one particular embodiment. However, it is also possible to change the semantics of the syntax element anchor_pic_flag similarly instead of adding a new syntax element.

| nal_unit_header_svc_mvc_extension( ) { | C | Descriptor |
|---|---|---|
| svc_mvc_flag | All | u(1) |
| if (!svc_mvc_flag) { | | |
| priority_id | All | u(6) |
| discardable_flag | All | u(1) |
| temporal_level | All | u(3) |
| dependency_id | All | u(3) |
| quality_level | All | u(2) |
| layer_base_flag | All | u(1) |
| use_base_prediction_flag | All | u(1) |
| fragmented_flag | All | u(1) |
| last_fragment_flag | All | u(1) |
| fragment_order | All | u(2) |
| reserved_zero_two_bits | All | u(2) |
| } else { | | |
| view_refresh_flag | All | u(1) |
| view_subset_id | All | u(2) |
| view_level | All | u(3) |
| anchor_pic_flag | All | u(1) |
| view_id | All | u(10) |
| reserved_zero_five_bits | All | u(6) |
| } | | |
| nalUnitHeaderBytes += 3 | | |
| } | | |

For a certain picture in a view, all of the pictures at the same temporal location from other views that are used inter view prediction are referred to as "the directly depend-on view pictures," and all the pictures at the same temporal location from other views that are required for decoding of the current picture are referred to as "the depend-on view pictures."

The semantics of the view_refresh_flag can be specified in four ways in one embodiment. A first way for specifying the semantics of the view_refresh_flag involves having the view_refresh_flag indicate that the current picture and all subsequent pictures in output order in the same view can be correctly decoded when all of the directly depend-on view pictures of the current and subsequent pictures in the same view and are also (possibly partially) decoded without decoding any preceding picture in the same view or other views. This implies that (1) none of the depend-on view pictures relies on any preceding picture in decoding order in any view, or (2) if any of the depend-on view pictures rely on any preceding picture in decoding order in any view, then only the constrainedly intra-coded areas of the directly depend-on view pictures of the current and subsequent pictures in the same view are used for inter-view prediction. A constrainedly intra-coded area uses no data from inter-coded neighboring areas for intra prediction.

A second way for specifying the semantics of the view_refresh_flag involves having the view_refresh_flag indicate that the current picture and all subsequent pictures in decoding order in the same view can be correctly decoded when all the directly depend-on view pictures of the current picture and subsequent pictures in the same view are also completely or, in one embodiment, partially decoded without decoding any preceding picture.

A third way for specifying the semantics of the view_refresh_flag involves having the view_refresh_flag indicate that the current picture and all subsequent pictures in output order in the same view can be correctly decoded when all the depend-on view pictures of the current and subsequent pictures in the same view are also completely or, on one embodiment, partially decoded. This definition is analog to an intra picture starting an open GOP in single-view coding. In terms of specification text, this option can be written as follows: A view_refresh_flag equal to 1 indicates that the current picture and any subsequent picture in decoding order in the same view as the current picture and following the current picture in output order do not refer to a picture preceding the current picture in decoding order in the inter prediction process. A view_refresh_flag equal to 0 indicates that the current picture or a subsequent picture in decoding order in the same view as the current picture and following the current picture in output order may refer to a picture preceding the current picture in decoding order in the inter prediction process.

A fourth way for specifying the semantics of the view_refresh_flag involves having the view_refresh_flag indicate that the current picture and all subsequent pictures in decoding order in the same view can be correctly decoded when all the depend-on view pictures of the current and subsequent pictures in the same view are also completely or, in one embodiment, partially decoded. This definition is analog to an intra picture starting a closed GOP in single-view coding.

The view_refresh_flag can be used in a system such as that depicted in FIG. 4. In this situation, the receiver 150 has received, or the decoder 160 has decoded, only a certain subset M of all available N views, the subset excluding view A. Due to a user action, for example, the receiver 150 or the decoder 160 would like to receive or decode, respectively, view A from now on. The decoder may start the decoding of view A from the first picture, having view_refresh_flag equal to 1 within view A. If view A was not received, then the receiver 150 may indicate to the Gateway 140 or the sender 130 to include coded pictures of view A into the transmitted bitstream. The gateway 140 or the sender 130 may wait until the next picture having a view_refresh_flag equal to 1 within view A before sending any pictures of view A in order to avoid the sending of unnecessary pictures from view A that the decoder 160 could not successfully decode.

To address the second issue discussed previously, a new flag is signaled to indicate whether a view is used for inter-view prediction reference, and the syntax element nal_ref_idc only indicates whether a picture is used for temporal prediction reference. In one particular embodiment, this flag is signaled in the NAL unit header. The following (and as also illustrated in FIG. 7) is an example of the syntax and semantics of the flag.

| nal_unit_header_svc_mvc_extension( ) { | C | Descriptor |
|---|---|---|
| svc_mvc_flag | All | u(1) |
| if (!svc_mvc_flag) { | | |
| priority_id | All | u(6) |

-continued

| nal_unit_header_svc_mvc_extension( ) { | C | Descriptor |
|---|---|---|
| discardable_flag | All | u(1) |
| temporal_level | All | u(3) |
| dependency_id | All | u(3) |
| quality_level | All | u(2) |
| layer_base_flag | All | u(1) |
| use_base_prediction_flag | All | u(1) |
| fragmented_flag | All | u(1) |
| last_fragment_flag | All | u(1) |
| fragment_order | All | u(2) |
| reserved_zero_two_bits | All | u(2) |
| } else { | | |
| inter_view_reference_flag | All | u(1) |
| view_subset_id | All | u(2) |
| view_level | All | u(3) |
| anchor_pic_flag | All | u(1) |
| view_id | All | u(10) |
| reserved_zero_five_bits | All | u(5) |
| } | | |
| nalUnitHeaderBytes += 3 | | |
| } | | |

An inter_view_reference_flag equal to 0 indicates that the current picture is not used as an inter-view reference picture. An inter_view_reference_flag equal to 1 indicates that the current picture is used as inter-view reference picture. The value of the inter_view_reference_flag is inferred to be equal to 1 when profile_idc indicates an MVC profile and view_id is 0. When decoding a picture, all pictures that have an inter_view_reference_flag equal to 1 and with the same temporal axis as the current picture are referred to as inter-view pictures of the current picture.

The inter_view_reference_flag can be used in a gateway 140, also referred to as a media-aware network element (MANE). When a picture is not used as inter-view reference and intra-view reference (inter_view_reference_flag is equal to 0 and nal_ref_idc is equal to 0), a MANE may choose not to forward it without consequences in the decoding of the remaining bitstream. When a picture is not used as an inter-view reference but used as an intra-view reference, a MANE should drop the picture only if it also drops transmission of the dependent views. When a picture is not used as an inter-view reference but used as an intra-view reference, a MANE should drop the picture only if it is not required or desired to decode the view in which the picture resides.

With regard to the issue of the reference picture marking process specified in JMVM 1.0 not being able to efficiently handle the management of decoded pictures that must be buffered for inter-view prediction, the flag inter_view_reference_flag is reused. Pictures with an inter_view_reference_flag equal to 1 can be marked using any of a number three methods.

A first method for marking pictures with an inter_view_reference_flag equal to 1 involves storing inter-view reference pictures temporally as long-term pictures. In the encoding process, each picture used for inter-view prediction is indicated in the bitstream to be marked as "used for long-term reference." One way for indicating the marking as "used for long-term reference" is the inter_view_reference_flag. The decoder responds to the indication by marking the picture as "used for long-term reference" and "temporary multi-view long-term reference." Any memory management control operation targeted to a picture marked as "used for long-term reference" and "temporary multi-view long-term reference" is buffered temporarily. When all pictures in the temporal axis are encoded or decoded, all pictures marked as "used for long-term reference" and "temporary multi-view long-term reference" are no longer marked as "used for long-term reference" and "temporary multi-view long-term reference," and reference picture marking is re-done for them in their decoding order using either the sliding window operation or buffered memory management control operations (whichever are applicable to a particular picture). For example, if a picture is used for inter prediction (i.e., the value of nal_ref_idc is greater than 0), it is marked back to as "used for short-term reference." If the picture is not used for inter prediction (i.e., nal_ref_idc equals to 0), it is marked as "unused for reference." Usually, there are only two cases for the picture in a certain temporal axis: all pictures are reference pictures for inter prediction, or no picture is a reference picture for inter prediction. This last operation can be performed after the last VCL NAL unit in the temporal axis is decoded, or before the next access unit or the next picture in the subsequent temporal axis is to be decoded. In the decoding process, the operation in this stage can be implicitly triggered by the change in temporal axis, or it can be explicitly signaled e.g. as an MMCO command. With this method, the inter-view reference pictures have the same influence as long term reference pictures for weighted prediction and in the temporal direct mode.

A second method for marking pictures with an inter_view_reference_flag equal to 1 involves marking inter-view reference pictures as "used for inter-view reference." With this method, the reference picture marking for inter prediction (marking as "used for short-term reference" and "used for long-term reference") is unchanged compared to the AVC standard. For processes related to the temporal direct mode and weighted prediction, pictures marked as "used for inter-view reference," i.e., those inter-view reference pictures that share the same temporal axis as current picture, are treated identically to long-term reference pictures. When all pictures in the temporal axis are encoded or decoded, all pictures marked as "used for inter-view reference" are no longer marked as "used for inter-view reference."

It is noted that the removal of "used for inter-view reference" marking after all of the pictures in the temporal axis are processed is just one embodiment of the invention. The marking as "used for inter-view reference" could also be removed in other instants of the decoding process. For example, marking as "used for inter-view reference" of a particular picture can be removed as soon as the current picture or any subsequent picture no longer directly or indirectly depends on the picture according to the view dependency signaling included in the MVC extension of SPS.

The operation of having the appropriate pictures no longer being marked as "used for inter-view reference" can be done after the last VCL NAL unit in the temporal axis is decoded or before the next access unit or the next picture in the subsequent temporal axis is to be decoded. In the decoding process, this can be implicitly triggered by the change in temporal axis or it can be explicitly signaled e.g. as an MMCO command.

With this particular method, the inter-view reference pictures have the same influence as long term reference pictures for weighted prediction and in the temporal direct mode. In other words, this method has the same effect as the first method discussed above for weighted prediction and in the temporal direct mode.

In this method, an improved sliding window mechanism can be applied to remove the marking of "used for inter-view reference" of pictures used only for inter-view prediction, i.e. for pictures having nal_ref_idc equal to 0 and marked as "used for inter-view reference." This improved sliding window mechanism uses a variable, e.g. named as num_inter_view_ref_frames, preferably signaled in the SPS extension for MVC, such that when the number of pictures marked as "used for inter-view reference" and having nal_ref_idc equal to 0 is equal to num_inter_view_ref_frames, then the earliest decoded one becomes not marked as "used for inter-view reference." Consequently, if the picture is not needed for output (output already or intentionally not to output) either, the decoder can invoke a process to remove the picture from the DPB such that a newly decoded picture can be stored to the DPB.

A third method for marking pictures with an inter_view_reference_flag equal to 1 involves marking pictures after the decoding of all pictures of the same temporal axis/time index. Instead of marking a picture immediately after its decoding, this method is based on the idea that pictures are marked after the decoding of all pictures of the same temporal axis (i.e., the same time index). Sliding window or adaptive reference picture marking as indicated in each of the coded pictures is performed in the order pictures were decoded. For processes related to the temporal direct mode and weighted prediction, pictures marked of the same temporal axis as the current picture are treated identically to long-term reference pictures. The inter-view reference pictures of the same temporal axis as the current picture are included in the initial reference picture list construction and can be reordered based on their view_id or are first assigned long-term reference indices and can be then remapped based on the long-term reference index.

As discussed previously, given the way to recalculate the PicNum, if the sliding window operation mode is in use and the number of short-term and long-term pictures is equal to the maximum, the short-term reference picture that has the smallest FrameNumWrap is marked as "unused for reference." However, due to the fact that this picture is not necessarily the earliest coded picture because the FrameNum order in the current JMVM does not follow the decoding order, the sliding window reference picture marking does not operate optimally in the current JMVM. To address this issue, and as compared to the JMVM standard, the variables FrameNum and FrameNumWrap are not redefined/scaled, i.e. their definition is kept unchanged compared to the AVC standard. It is designed that the short-term pictures can be automatically managed by the first-in, first-out mechanism of the sliding window. Only slight modification of the sliding window mechanism compared to JMVM 1.0 is required. The modifications are as follows, with new text represented in italics:

G. 8.2.5.3 Sliding window decoded reference picture marking process

This process is invoked when adaptive_ref_pic_marking_mode_flag is equal to 0. Only the reference pictures having the same view_id as the current slice is considered in the process, including the calculation of numShortTerm and numLongTerm, and the applied value of num_ref_frames.

In the above method, the total number of reference frames for the entire MVC bitstream, which indicates the buffer size for storage of pictures used for intra-view or inter-view reference of an entire MVC bitstream, should be equal to the sum of the num_ref_frames values applied for all the views contained in the MVC bitstream plus the maximum number of inter-view reference frames for decoding the MVC bitstream. Alternatively, the sliding window can be performed globally for all of the pictures in all views.

For time-first coding, the sliding window process is defined as below, with new text to JMVM 1.0 represented in italics: G. 8.2.5.3 Sliding window decoded reference picture marking process

. . .

. . .

When numShortTerm+numLongTerm is equal to Max (num_ref_frames, 1), the condition that numShortTerm is greater than 0 shall be fulfilled, and the short-term reference frame, complementary reference field pair or non-paired reference field that is selected by the following rule is marked as "unused for reference". When it is a frame or a complementary field pair, both of its fields are also marked as "unused for reference".

* The selection rule is: from all those pictures with the smallest value of FrameNumWrap, the first one in decoding order is selected. The decoding order of those pictures may be indicated by the view_id value, or the view dependency information signalled in the SPS fro MVC extension.

For time-first coding, the sliding window process is defined as below, with new text to JMVM 1.0 represented in italics:
G. 8.2.5.3 Sliding window decoded reference picture marking process
. . .
. . .

When numShortTerm+numLongTerm is equal to Max (num_ref_frames, 1), the condition that numShortTerm is greater than 0 shall be fulfilled, and the short-term reference frame, complementary reference field pair or non-paired reference field that is selected by the following rule is marked as "unused for reference". When it is a frame or a complementary field pair, both of its fields are also marked as "unused for reference".

* The selection rule is: from all those pictures of the earliest decoded view, the one with the smallest FrameNumWrap is selected. The view decoding order may be indicated by the view_id value, or the view dependency information signalled in the SPS fro MVC extension.

As discussed previously, due to the fact that PicNum is derived from the redefined and scaled FrameNumWrap, the difference between the PicNum values of two coded pictures would be scaled in average. For example, it is helpful to assume that there are two pictures in the same view and having frame_num equal to 3 and 5, respectively. When there is only one view, i.e. the bitstream is an AVC stream, then the difference of the two PicNum values would be 2. When coding the picture having frame_num equal to 5, if an MMCO command is needed to mark the picture having PicNum equal to 3 as "unused for reference", then the difference of the two values minus 1 is equal to 1, which is to be signalled in the MMCO. This value needs 3 bits. However, if there are 256 views, then the difference of the two PicNum values minus 1 would become 511. In this case, 19 bits are required for signalling of the value. Consequently, MMCO commands are much less efficiently coded. Typically, the increased number of bits is equal to 2*log 2(number of views) for an MMCO command of the current JMVM compared to single-view coding of H.264/AVC.

To address this issue and in contrast to the JMVM standard, the variables FrameNum and FrameNumWrap are not redefined/scaled, which is the same as in the AVC standard. In most cases, it is not required from the DPB size point of view that a picture contains a MMCO command to remove a picture which is neither belonging to the same view nor belonging to the same temporal axis as the current picture. Even some of the pictures become no longer needed for reference and therefore can be marked as "unused for reference." In this case, the marking can be performed by using the sliding window process or be postponed until the next coded picture with the same view_id. Therefore, the MMCO commands are constrained to only mark pictures as "unused for reference" for pictures belonging to the same view or the same temporal axis, although the DPB may contain pictures of different views or different temporal axes.

The modification of JMVM 1.0 for intra-view reference picture marking is as below, with changes shown in italics:
G.8.2.5.4.1 Marking process of a short-term reference picture as "unused for reference"
This process is invoked when adaptive_ref_pic_marking_mode_flag is equal to 1. Only the reference pictures having the same view_id as the current slice is considered in the process.

The syntax and semantics for inter-view reference picture marking can be as follows:

| slice_header( ) { | C | Descriptor |
|---|---|---|
| ... | | |
| if( nal_ref_idc != 0 ) | | |
|    dec_ref_pic_marking( ) | 2 | |
| if(inter_view_reference_flag) | | |
|    dec_view_ref_pic_marking_mvc( ) | 2 | |
| } | | |

| dec_view_ref_pic_marking_mvc( ) { | C | Descriptor |
|---|---|---|
|   adaptive_view_ref_pic_marking_mode_flag | 2 | u(1) |
|   if( adaptive_view_ref_pic_marking_mode_flag ) | | |
|     do { | | |
|       view_memory_management_control_operation | 2 | ue(v) |
|       if(view_memory_management_control_operation == 1 \|\| | | |
|       view_memory_management_control_operation == 2) | | |
|         abs_difference_of_view_id_minus1 | 2 | ue(v) |
|     } while( view_memory_management_control_operation != 0 ) | | |
|   } | | |
| } | | |

Memory management control operation (view_memory_management_control_operation) values are as follows

| view_memory_management_control_operation | Memory Management Control Operation |
|---|---|
| 0 | End view memory_management_control_operation loop |
| 1 | Remove the marking of "used for inter-view reference" or mark a picture as "unused for reference", abs_difference_of_view_id_minus1 is present and corresponds to a difference to subtract from the current view id |
| 2 | Remove the marking of "used for inter-view reference" or mark a picture as "unused for reference", abs_difference_of_view_id_minus1 is present and corresponds to a difference to add to the current view id |

The adaptive_view_ref_pic_marking_mode_flag specifies whether the sliding window mechanism (when equal to 0) or the adaptive reference picture marking process (when equal to 1) is in use.

The modified decoding process for inter-view reference picture marking is as follows:
8.2.5.5.2 Marking of inter-view pictures
This process is invoked when view_memory_management_control_operation is equal to 1.
Let viewIDX be specified as follows.

```
if(view_memory_management_control_operation==1)
    viewIDX = CurrViewId − ( difference_of_view_id_minus1 + 1 )
else if(view_memory_management_control_operation==2)
    viewIDX = CurrViewId + ( difference_of_view_id_minus1 + 1 )
```

To allow view scalability, i.e. the possibility of choosing which views are transmitted, forwarded, or decoded, the memory management control operations can be constrained as follows. If currTemporalLevel be equal to the temporal_level of the current picture and dependentViews be a set of views that depend on the current view, an MMCO command can only target to a picture that has a temporal_level equal to or greater than the currTemporalLevel and is within dependentViews. To allow this, MMCO commands are appended with an indication of the view_id or new MMCO commands with an indication of the view_id are specified.

In order to address the issues relating to the reference picture list construction process described previously, the variables FrameNum and FrameNumWrap are not redefined/scaled. This is the same action as occurs in the AVC standard and is in contrast to the JMVM standard, where the variables are redefined/rescaled. The modification of JMVM 1.0 is as below, with changes shown in italics:
In 8.2.4.3.1 Reordering process of reference picture lists for short-term reference pictures, the 8-38 shall be changed as:

```
for( cIdx = num_ref_idx_lX_active_minus1 + 1;
cIdx > refIdxLX; cIdx-- )
    RefPicListX[ cIdx ] = RefPicListX[ cIdx − 1]
RefPicListX[ refIdxLX++ ] = short-term reference picture with PicNum
equal to picNumLX and view_id equal to CurrViewID
nIdx = refIdxLX
for( cIdx = refIdxLX; cIdx <= num_ref_idx_lX_active_minus1 + 1;
cIdx++ ) (8-38)
    //if( PicNumF( RefPicListX[ cIdx ] ) != picNumLX )
```

-continued

```
    if( PicNumF( RefPicListX[ cIdx ] ) != picNumLX ||
ViewID(RefPicListX[ cIdx ] ) != CurrViewID)
        RefPicListX[ nIdx++ ] = RefPicListX[ cIdx ]
```

Where CurrViewID is the view_id of the current decoding picture.

Regarding the problems associated with the reference picture list initialization process discussed previously, these issues can be addressed by noting that only frames, fields, or field pairs belonging to the same view as the current slice can be considered in the initialization process. In terms of JMVM 1.0, this language can be added to the beginning of each of each of subclauses 8.2.4.2.1 "Initialisation process for the reference picture list for P and SP slices in frames" through 8.2.4.2.5 "Initialisation process for reference picture lists in fields."

Regarding the other issues relating to the reference picture list construction process, a number of methods can be used to efficiently reorder both inter-view pictures and pictures used for intra-prediction. A first such method involves putting inter-view reference pictures in front of intra-view reference pictures in the list, as well as specifying separate RPLR processes for inter-view pictures and pictures for intra-view prediction. Pictures used for intra-view prediction are also referred to as intra-view pictures. In this method, the reference picture list initialization process for intra-view pictures as specified above is performed, followed by the RPLR reordering process and list truncation process for intra-view pictures. Next, the inter-view pictures are appended to the list after the intra-view pictures. Lastly, each inter-view picture may be further selected and put into a specified entry of the reference picture list using the following syntax, semantics and decoding process, modified from JMVM 1.0. The method is applicable to both refPicList0 and refPiclist1, if present.

| ref_pic_list_reordering( ) { | C | Descriptor |
|---|---|---|
| if( slice_type != I && slice_type != SI ) { | | |
| ... | | |
| } | | |
| if (svc_mvc_flag) | | |
| { | | |
|   view_ref_pic_list_reordering_flag_l0 | 2 | u(l) |
|   if(view_ref_pic_list_reordering_flag_l0) | | |
|   do { | | |
|     view_reordering_idc | 2 | ue(v) |
|     if( view_reordering_idc == 0 || | | |

-continued

| ref_pic_list_reordering( ) { | C | Descriptor |
|---|---|---|
|         view_reordering_idc == 1 ) | | |
|             abs_diff_view_idx_minus1 | 2 | ue(v) |
|             ref_idx | 2 | ue(v) |
|         } while(view_reordering_idc!= 2 ) | | |
|     view_ref_pic_list_reordering_flag_l1 | 2 | u(1) |
|     if(view_ref_pic_list_reordering_flag_l1 ) | | |
|     do { | | |
|         view_reordering_idc | 2 | ue(v) |
|         if( view_reordering_idc == 0 || | | |
|         view_reordering_idc == 1 ) | | |
|             abs_diff_view_idx_minus1 | 2 | ue(v) |
|             ref_idx | 2 | ue(v) |
|     } while(view_reordering_idc != 2 ) | | |
| } | | |

With regard to syntax, a view_ref_pic_list_reordering_flag_1X (X is 0 or 1) equal to 1 specifies that the syntax element view_reordering_idc is present for refPicListX. A view_ref_pic_list_reordering_flag_1X equal to 0 specifies that the syntax element view_reordering_idc is not present for refPicListX. The ref idx indicates the entry that the inter-view picture to be put to the reference picture list.

The abs_diff_view_idx_minus1 plus 1 specifies the absolute difference between the view index of the picture to put to the entry of the reference picture list indicated by the ref idx and the view index prediction value. abs_diff_view_idx_minus1 is in the range of 0 to num_multiview_refs_for_listX[view_id]−1. num_multiview_refs_for_listX[ ] refers to anchor_reference_view_for_listX[curr_view_id][ ] for an anchor picture and non_anchor_reference_view_for_listX[curr_view_id][ ] for a non-anchor picture, where the curr_view_id is equal to the view_id of the view containing the current slice. A view index of an inter-view picture indicates the order of the view_id of the inter-view picture occurring in the MVC SPS extension. For a picture with a view index equal to view_index, the view_id is equal to num_multiview_refs_for_listX[view_index].

The abs_diff_view_idx_minus1 plus 1 specifies the absolute difference between the view index of the picture being moved to the current index in the list and the view index prediction value. The abs_diff_view_idx_minus1 is in the range of 0 to num_multiview_refs_for_listX[view_id]−1. The num_multiview_refs_for_listX[ ] refers to anchor_reference_view_for_listX[curr_view_id][ ] for an anchor picture and non_anchor_reference_view_for_listX[curr_view_id][ ] for a non-anchor picture, where the curr_view_id is equal to the view_id of the view containing the current slice. A view index of an inter-view picture indicates the order of the view_id of the inter-view picture occurring in the MVC SPS extension. For a picture with a view index equal to view_index, the view_id is equal to num_multiview_refs_for_listX[view_index].

The decoding process is as follows:
Definition of NumRefIdxLXActive is done after the truncation for intra-view pictures:

NumRefIdxLXActive = num_ref_idx_lX_active_minus1 +1+ num_multiview_refs_for_listX[view_id]

G.8.2.4.3.3 Reordering process of reference picture lists for inter-view pictures Inputs to this process are reference picture list RefPicListX (with X being 0 or 1). Outputs of this process are a possibly modified reference picture list RefPicListX (with X being 0 or 1).

The variable picViewIdxLX is derived as follows.

If view_reordering_idc is equal to 0
picViewIdxLX = picViewIdxLXPred − ( abs_diff_view_idx_minus1 + 1 )
Otherwise (view_reordering_idc is equal to 1),
picViewIdxLX = picViewIdxLXPred + ( abs_diff_view_idx_minus1+ 1 )

picViewIdxLXPred is the prediction value for the variable picViewIdxLX. When the process specified in this subclause is invoked the first time for a slice (that is, for the first occurrence of view_reordering_idc equal to 0 or 1 in the ref_pic_list_reordering( ) syntax), picViewIdxL0Pred and picViewIdxL1Pred are initially set equal to 0. After each assignment of picViewIdxLX, the value of picViewIdxLX is assigned to picViewIdxLXPred.

The following procedure is conducted to place the inter-view picture with view index equal to picViewIdxLX into the index position ref_Idx shift the position of any other remaining pictures to later in the list, as follows.

```
for( cIdx = NumRefIdxLXActive; cIdx > ref_Idx; cIdx-- )
    RefPicListX[ cIdx ] = RefPicListX[ cIdx − 1]
RefPicListX[ref_Idx ] = inter-view reference picture with view id equal to
    reference_view_for_list_X[picViewIdxLX]
nIdx = ref_Idx+1;
for( cIdx = refIdxLX; cIdx <= NumRefIdxLXActive; cIdx++ )
    if( ViewID(RefPicListX[ cIdx ] ) !=
TargetViewID||Time(RefPicListX[ cIdx ])!=TargetTime)
        RefPicListX[ nIdx++ ] = RefPicListX[ cIdx ]
preView_id=PicViewIDLX
```

According to a second method for efficiently reordering both inter-view pictures and pictures used for intra-prediction, the reference picture list initialization process for intra-view pictures as specified above is performed, and the inter-view pictures are then appended to the end of the list in the order as they occur in the MVC SPS extension. Subsequently, a RPLR reordering process for both intra-view and inter-view pictures is applied, followed by a list truncation process. Sample syntax, semantics and decoding process, modified based on JMVM 1.0, are as follows.

Reference Picture List Reordering Syntax

| ref_pic_list_reordering( ) { | C | Descriptor |
|---|---|---|
|   if( slice_type != I && slice_type != ) { | | |
|     ref_pic_list_reordering_flag_l0 | 2 | u(1) |
|     if( ref_pic_list_reordering_flag_l0 ) | | |
|     do { | | |
|       reordering_of_pic_nums_idc | 2 | ue(v) |
|       if( reordering_of_pic_nums_idc == 0 || | | |
|       reordering_of_pic_nums_idc == 1 ) | | |
|         abs_diff_pic_num_minus1 | 2 | ue(v) |
|       else if( reordering_of_pic_nums_idc == 2 ) | | |
|         long_term_pic_num | 2 | ue(v) |
|       if (reordering_of_pic_nums_idc == 4 || | | |
|       reordering_of_pic_nums_idc == 5) | | |
|         abs_diff_view_idx_minus1 | 2 | ue(v) |
|     } while( reordering_of_pic_nums_idc != 3 ) | | |
|   } | | |
|   if( slice_type == B || slice_type == EB ) { | | |
|     ref_pic_list_reordering_flag_l1 | 2 | u(1) |
|     if( ref_pic_list_reordering_flag_l1 ) | | |

-continued

| ref_pic_list_reordering( ) { | C | Descriptor |
|---|---|---|
| do { | | |
| reordering_of_pic_nums_idc | 2 | ue(v) |
| if( reordering_of_pic_nums_idc == 0 \|\| | | |
| reordering_of_pic_nums_idc == 1 ) | | |
| abs_diff_pic_num_minus1 | 2 | ue(v) |
| else if( reordering_of_pic_nums_idc == 2 ) | | |
| long_term_pic_num | 2 | ue(v) |
| if (reordering_of_pic_nums_idc == 4 \|\| | | |
| reordering_of_pic_nums_idc == 5) | | |
| abs_diff_view_idx_minus1 | 2 | ue(v) |
| } while( reordering_of_pic_nums_idc != 3 ) | | |
| } | | |
| } | | |

G 7.4.3.1 Reference picture list reordering semantics

Table

Reordering_of_pic_nums_idc operations for reordering of reference picture lists

| reordering_of_pic_nums_idc | Reordering specified |
|---|---|
| 0 | abs_diff_pic_num_minus1 is present and corresponds to a difference to subtract from a picture number prediction value |
| 1 | abs_diff_pic_num_minus1 is present and corresponds to a difference to add to a picture number prediction value |
| 2 | long_term_pic_num is present and specifies the long-term picture number for a reference picture |
| 3 | End loop for reordering of the initial reference picture list |
| 4 | abs_diff_view_idx_minus1 is present and corresponds to a difference to subtract from a view index prediction value |
| 5 | abs_diff_view_idx_minus1 is present and corresponds to a difference to add to a view index prediction value |

The reordering_of_pic_nums_idc, together with abs_diff_pic_num_minus1 or long_term_pic_num, specifies which of the reference pictures are re-mapped. The reordering_of_pic_nums_idc, together with abs_diff_view_idx_minus1, specifies of the inter-view reference pictures are re-mapped. The values of reordering_of_pic_nums_idc are specified in the table above. The value of the first reordering_of_pic_nums_idc that follows immediately after ref_pic_list_reordering_flag_10 or ref_pic_list_reordering_flag_11 is not equal to 3.

The abs_diff_view_idx_minus1 plus 1 specifies the absolute difference between the view index of the picture to put to the current index in the reference picture list and the view index prediction value. abs_diff_view_idx_minus1 is in the range of 0 to num_multiview_refs_for_listX[view_id]−1. num_multiview_refs_for_listX[ ] refers to anchor_reference_view_for_listX[curr_view_id][ ] for an anchor picture and non_anchor_reference_view_for_listX[curr_view_id][ ] for a non-anchor picture, where the curr_view_id is equal to the view_id of the view containing the current slice. A view index of an inter-view picture indicates the order of the view_id of the inter-view picture occurring in the MVC SPS extension. For a picture with a view index equal to view_index, the view_id is equal to num_multiview_refs_for_listX[view_index].

The reordering process can be described as follows.

G. 8.2.4.3.3 Reordering process of reference picture lists for inter-view reference pictures Input to this process is an index refIdxLX (with X being 0 or 1). Output of this process is an incremented index refIdxLX. The variable picViewIdxLX is derived as follows.

If reordering_of_pic_nums_idc is equal to 4
picViewIdxLX=picViewIdxLX Pred−(abs_diff_view_idx_minus1+1)

Otherwise (reordering_of_pic_nums_idc is equal to 5),
picViewIdxLX=picViewIdxLX Pred+(abs_diff_view_idx_minus1+1)

picViewIdxLXPred is the prediction value for the variable picViewIdxLX. When the process specified in this subclause is invoked the first time for a slice (that is, for the first occurrence of reordering_of_pic_nums_idc equal to 4 or 5 in the ref_pic_list_reordering( ) syntax), picViewIdxL0Pred and picViewIdxL1Pred are initially set equal to 0. After each assignment of picViewIdxLX, the value of picViewIdxLX is assigned to picViewIdxLXPred.

The following procedure is conducted to place the inter-view picture with view index equal to picViewIdxLX into the index position refIdxLX, shift the position of any other remaining pictures to later in the list, and increment the value of refIdxLX.

```
for( cIdx = num_ref_idx_lX_active_minus1 + 1;
cIdx > refIdxLX; cIdx−− )
    RefPicListX[ cIdx ] = RefPicListX[ cIdx − 1]
RefPicListX[ refIdxLX++ ] = inter-view reference picture with view id
        equal to reference_view_for_list_X[picViewIdxLX]
nIdx = refIdxLX
for( cIdx = refIdxLX; cIdx <= num_ref_idx_lX_active_minus1 + 1;
cIdx++ )
    if( ViewID(RefPicListX[ cIdx ] ) !=
TargetViewID||Time(RefPicListX[ cIdx ])!= TargetTime)
        RefPicListX[ nIdx++ ] = RefPicListX[ cIdx ]
```

Where TargetViewID and TargetTime indicates the view_id or temporal axis value of the target reference picture to be reordered, and Time(pic) returns the temporal axis value of the picture pic.

According to a third method for efficiently reordering both inter-view pictures and pictures used for intra-prediction, the initial reference picture list contains pictures marked as "used as short-term reference" or "used as long-term reference" and having the same view_id as the current picture. Additionally, the initial reference picture list contains the pictures that can be used for inter-view prediction. The pictures used for inter-view prediction are concluded from the sequence parameter set extension for MVC and may also be concluded from the inter_view_reference_flag. The pictures for inter-view prediction are assigned certain long-term reference indices for the decoding process of this picture. The assigned long-term reference indices for inter-view reference pictures may, for example, be the first N reference indices, and the indices for intra-view long-term pictures may be modified to be equal to their previous value+N for the decoding process of this picture, where N represents the number of inter-view reference pictures. Alternatively, the assigned long-term reference indices may be in the range from MaxLongTermFrameIdx+1 to MaxLongTermFrameIdx+N, inclusive. Alternatively, the sequence parameter set extension for MVC may contain a syntax element, referred to herein as start_lt_index_for_rplr, and the assigned long-term indices allocate the range start_lt_index_for_rplr, inclusive, to start_lt_index_for_rplr+N, exclusive. The available long-term indices for inter-view reference pictures may be allocated in the order of view_id, camera order, or in the order the view dependencies are listed in the sequence parameter set extension for MVC. The RPLR commands (syntax and semantics) remain unchanged compared to the H.264/AVC standard.

For temporal direct-related processing, e.g., for motion vector scaling, if both reference pictures are inter prediction (intra-view prediction) pictures (i.e., the reference pictures are not marked as "used for inter-view reference"), then the AVC decoding process is followed. If one of the two reference pictures is an inter prediction picture and the other one is inter-view prediction picture, the inter-view prediction picture is treated as a long-term reference picture. Otherwise (if both reference pictures are inter-view pictures), view_id or camera order indicator values are used instead of POC values for the motion vector scaling.

For the derivation of prediction weights for implicit weighted prediction, the following process is performed. If both reference pictures are inter prediction (intra-view prediction) pictures (i.e. are not marked as "used for inter-view reference"), the AVC decoding process is followed. If one of the two reference pictures is an inter prediction picture and the other one is an inter-view prediction picture, then the inter-view prediction picture is treated as a long-term reference picture. Otherwise (i.e., both of the pictures are inter-view prediction pictures), the view_id or camera order indicator values are used instead of POC values for derivation of the weighted prediction parameters.

The present invention is described in the general context of method steps, which may be implemented in one embodiment by a program product including computer-executable instructions, such as program code, embodied on a computer-readable medium and executed by computers in networked environments. Examples of computer readable mediums can include various types of storage mediums including, but not limited to, electronic device memory units, random access memory (RAM), read only memory (ROM), compact discs (CDs), digital versatile discs (DVDs) and other internal or external storage devices. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

Software and web implementations of the present invention could be accomplished with standard programming techniques with rule based logic and other logic to accomplish the various database searching steps, correlation steps, comparison steps and decision steps. It should also be noted that the words "component" and "module," as used herein and in the claims, is intended to encompass implementations using one or more lines of software code, and/or hardware implementations, and/or equipment for receiving manual inputs.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments and with various modifications as are suited to the particular use contemplated.

What is claimed is:

1. A method of encoding a plurality of scene signals representing a plurality of views of a scene, the method comprising:
   providing a signalling element corresponding to a picture of a view, the signalling element representative of whether or not the picture of the view is used as a reference for any other picture belonging to a different view,
   wherein the signalling element is a flag and signaled in a network abstraction layer (NAL) unit header corresponding to the picture;
   constructing an initial reference picture list based on intra-view reference pictures and inter-view reference pictures,
   providing a second signalling element indicating whether reordering of intra-view reference pictures or reordering of inter-view reference pictures is to be performed, and
   providing a third signalling element for reordering of inter-view reference pictures relative to the initial reference picture list, the third signal element being derived based on a view identifier value.

2. A method of decoding an encoded video bitstream, a coded representation of a plurality of scene signals representing a plurality of views of a scene, the method comprising:
   retrieving a signalling element corresponding to a picture of a view from the encoded video bitstream, the signalling element representative of whether or not the picture corresponding to the view is used as a reference for any other picture belonging to a different view, wherein the signalling element is a flag and signaled in a network abstraction layer (NAL) unit header corresponding to the picture;
   constructing an initial reference picture list based on intra-view reference pictures and inter-view reference pictures;
   determining from a second signalling element whether reordering of intra-view reference pictures or reordering of inter-view reference pictures is to be performed, and
   based on the determining, reordering of inter-view reference pictures relative to the initial reference picture list based on a third signalling element, the third signal element being derived based on a view identifier value.

3. A method according to claim 2, the method further comprising:
   if the signalling element indicates that the picture of the view is not used as a reference for any one other picture belonging to a different view, omitting the transmission of a part of the encoded bitstream corresponding the picture.

4. A method according to claim 2, the method further comprising:
   if the signalling element indicates that the picture of the view is not used as a reference for any other picture belonging to a different view, omitting the decoding of a part of the encoded bitstream corresponding the picture.

5. An apparatus, comprising:
   a processor; and
   a memory unit communicatively connected to the processor and including computer code for providing a signalling element corresponding to a picture of a view, the signalling element representative of whether or not the picture of the view is used as a reference for any other picture belonging to a different view, wherein the signalling element is a flag and configured to be signaled in a network abstraction layer (NAL) unit header corresponding to the picture, wherein the apparatus is further configured to:
   construct an initial reference picture list based on intra-view reference pictures and inter-view reference pictures,
   provide a second signalling element indicating whether reordering of intra-view reference pictures or reordering of inter-view reference pictures is to be performed, and
   provide a third signalling element for reordering of inter-view reference pictures relative to the initial reference picture list, the second signalling element being derived based on a view identifier value.

6. An apparatus, comprising:
   a processor; and
   a memory unit communicatively connected to the processor and including computer code for retrieving a signalling element corresponding to a picture of a view from the encoded video bitstream, the signalling element representative of whether or not the picture corresponding to the view is used as a reference for any other picture belonging to a different view, wherein the signalling element is a flag and signaled in a network abstraction layer (NAL) unit header corresponding to the picture, wherein the apparatus is further configured to:
   construct an initial reference picture list based on intra-view reference pictures and inter-view reference pictures;
   determine from a second signalling element whether reordering of intra-view reference pictures or reordering of inter-view reference pictures is to be performed; and
   reorder inter-view reference pictures relative to the initial reference picture list based on a third signalling element, the third signaling element being derived based on a view identifier value.

7. An apparatus according to claim 6, the apparatus further comprises:
   computer code for omitting the transmission of a part of the encoded bitstream corresponding the picture if the signalling element indicates that the picture of the view is not used as a reference for any one other picture belonging to a different view.

8. An apparatus according to claim 6, the apparatus further comprises:
   computer code for omitting the decoding of a part of the encoded bitstream corresponding the picture if the signalling element indicates that the picture of the view is not used as a reference for any other picture belonging to a different view.

9. A computer program product, embodied in a non-transitory computer-readable medium, for decoding an encoded video bitstream, a coded representation of a plurality of scene signals representing a plurality of views of a scene, comprising:
   computer code for retrieving a signalling element corresponding to a picture of a view from the encoded video bitstream, the signalling element representative of whether or not the picture corresponding to the view is used as a reference for any other picture belonging to a different view, wherein the signalling element is a flag and signaled in a network abstraction layer (NAL) unit header corresponding to the picture;
   computer code for constructing an initial reference picture list based on intra-view reference pictures and inter-view reference pictures,
   computer code providing a second signalling element indicating whether reordering of intra-view reference pictures or reordering of inter-view reference pictures is to be performed, and
   computer code for providing a third signalling element for reordering of inter-view reference pictures relative to the initial reference picture list, the third signalling element being derived based on a view identifier value.

10. A computer program product according to claim 9, further comprising:
    computer code for omitting the transmission of a part of the encoded bitstream corresponding the picture if the signalling element indicates that the picture of the view is not used as a reference for any one other picture belonging to a different view.

11. A computer program product according to claim 9, further comprising:
    computer code for omitting the decoding of a part of the encoded bitstream corresponding the picture if the signalling element indicates that the picture of the view is not used as a reference for any other picture belonging to a different view.

* * * * *